United States Patent [19]
White et al.

[11] Patent Number: 5,311,856
[45] Date of Patent: May 17, 1994

[54] GAS GUN AND QUICK RELEASE MECHANISM FOR LARGE LOADS

[75] Inventors: Howard G. White; Alan P. Ohrt; Charles R. Welch, all of Vicksburg, Miss.

[73] Assignee: The United States of America as represented by the Secretary of the Army, Washington, D.C.

[21] Appl. No.: 963,364

[22] Filed: Oct. 20, 1992

[51] Int. Cl.$^5$ .................. G01M 19/00; F41B 11/00
[52] U.S. Cl. ...................... 124/56; 73/11.01; 73/12.07; 124/71; 124/34
[58] Field of Search .............. 73/11.01, 12.04, 12.07, 73/12.05, 12.09, 12.13; 181/121; 124/56, 31, 34, 71

[56] References Cited

U.S. PATENT DOCUMENTS

| | | | |
|---|---|---|---|
| 2,900,972 | 8/1959 | Marsh | 124/31 |
| 3,402,593 | 9/1968 | Bresk | 73/12.07 |
| 3,693,432 | 9/1972 | Stewart | 73/12.05 |
| 4,796,723 | 1/1989 | Laurent | 181/121 |
| 5,035,297 | 7/1991 | Meynier | 181/121 |
| 5,184,499 | 2/1993 | Oppliger | 73/11.01 |

FOREIGN PATENT DOCUMENTS 1136006  1/1985  U.S.S.R. .................. 124/31

Primary Examiner—Randolph A. Reese
Assistant Examiner—Anthony Knight
Attorney, Agent, or Firm—Luther A. Marsh

[57] ABSTRACT

A large diameter gas gun has a triggering mechanism for quickly and effectively releasing a large bore projectile which is accelerated under gas pressure to impact upon a target area to produce a substantial shock field.

10 Claims, 5 Drawing Sheets

GAS GUN AND QUICK RELEASE MECHANISM FOR LARGE LOADS

BACKGROUND OF THE INVENTION

This invention relates to fluid activated, (i.e., gas) guns and in particular the invention relates to a large diameter gas gun having a quick release mechanism for a heavy projectile.

Reliable, repeatable and non-explosive procedures for validating transducers used for monitoring simulated high energy environments are desired. A validated transducer is one which produces an output signal which is not only calibrated but is validated, that is, it makes a correct measurement of the applied parameter of interest. One method for measuring and testing the transducers is to produce a simulate high energy environment by means of a gas gun.

The ability of a gas gun to produce controlled and repeatable shock inputs is an attractive alternative to high explosive techniques which are typically used to test ground shock transducers. Typically, gas guns accelerate projectiles which are small (on the order of 6 inches in diameter or less) and which achieve high velocities. Small bores, however, limit the ability of known gas guns to test transducers in soils, because they are unable to produce large shock fields which are desirable for such tests.

SUMMARY OF THE INVENTION

One embodiment of the invention comprises a fluid activated large diameter gun for producing controlled, repeatable shock fields in a target area. The gun includes a hollow barrel having a downstream projectile end for alignment with the target area and an axially aligned upstream end. The barrel has a plurality of fluid ports upstream of the outlet. A heavy cylindrical projectile is adapted for slidable movement within the barrel from a cocked position in bridging relationship with the slots in the barrel, forming a fluid-tight seal with the slots. A forwardly extending target face impacts the target when the gun is fired. A rearward side of the projectile is coupled to a release mechanism mounted within the barrel upstream of the projectile in the cocked position. In a particular embodiment a chamber for containing a fluid under high pressure is secured to the exterior of the barrel and encloses the fluid inlets for pressurizing the barrel to cause the projectile to fire when released from the cocked position. A fluid reaction mass is disposed in the barrel rearwardly of the projectile for absorbing reaction forces when the gun is fired. A diaphragm may be secured within the barrel between the projectile and the fluid reaction mass for supporting the reaction mass.

In another embodiment, the invention comprises a release mechanism for a relatively large cylindrical projectile slidable in the barrel of a large bore fluid activated gun. An annular apertured ring has a forward bearing surface secured to the projectile. A latch having at least pivotally mounted rotatable member is secured to the barrel for engaging the forward bearing surface of the ring. A release collar is slidably mounted between first and second positions on the latch for engaging a free end of the latch in the first position to secure the projectile in the cocked position and to release the member when the release collar moves to the second position. Camming means is provided between the release collar and the rotatable member to cause the member to urge the projectile rearwardly of the barrel prior to firing.

In the exemplary embodiments described, the fluid is a compressible gas such as air.

DESCRIPTION OF THE INVENTION

Figure 1:
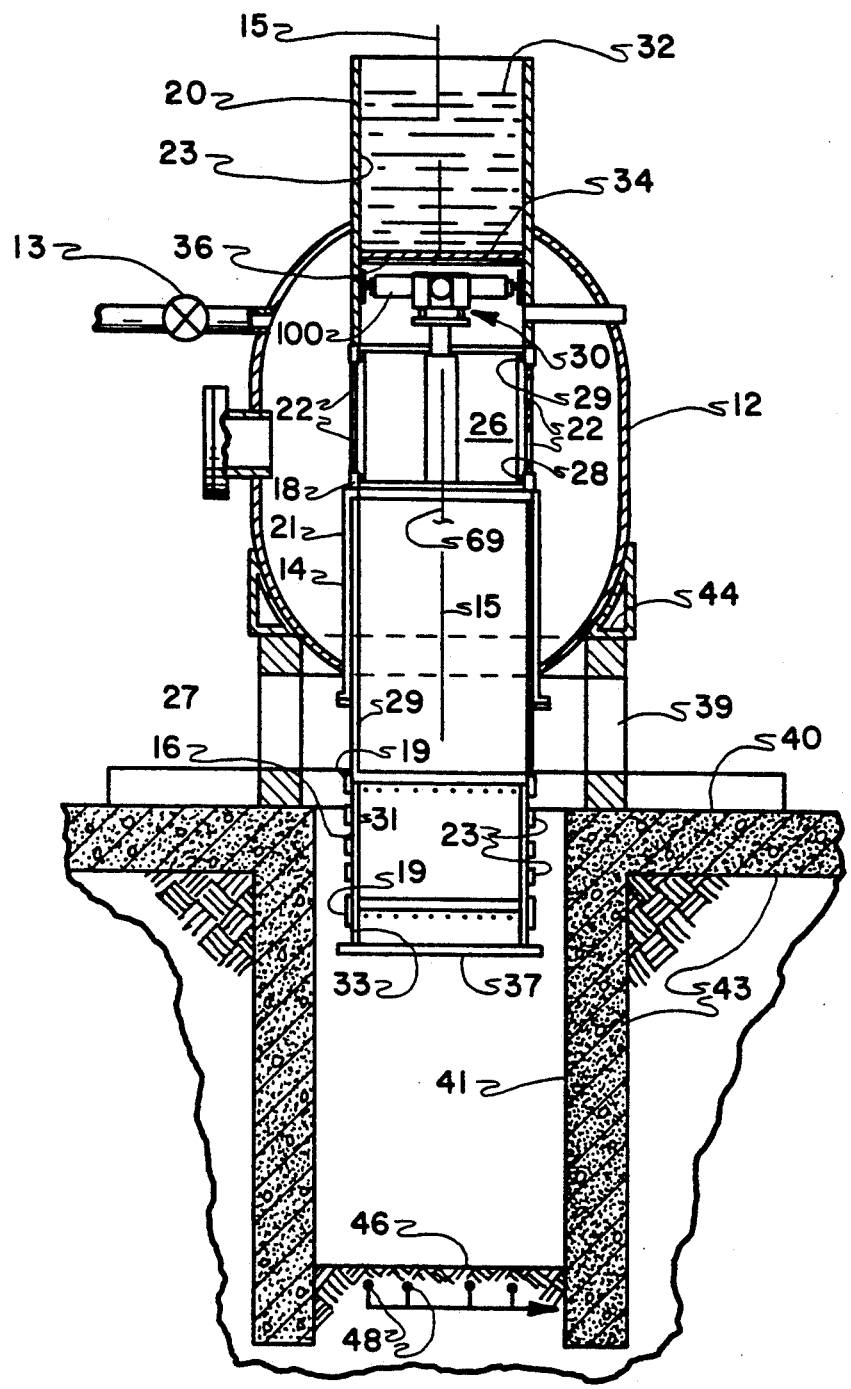
FIG. 1 is a side sectional view of a gas gun in accordance with the present invention.

FIG. 1 is a side sectional view of a large diameter fluid activated gun in accordance with the present invention. In the particular embodiment described, the fluid is compressible, (i.e., gas) and the apparatus is sometimes conveniently referred to a gas gun or gun 10. The diameter of the gas gun is about 4 ft. While a smaller diameter is useful, it has been found that the large diameter provides a desirable shock field. The gun 10 comprises a large annular pressure vessel 12 surrounding a cylindrical barrel 14 having a central axis 15. The barrel 14 has an outlet portion 16, a projectile portion 18, and a reaction mass portion 20 aligned along axis 15. In the embodiment shown, the length of the barrel 14 may be extended with additional sections secured by flanged joints 19. A series of longitudinal slots or orifices 22 are machined in the projectile portion 18 of the barrel. The pressure vessel 12 is secured to the exterior of the barrel 14 so as to bridge and enclose the slots 22. The outlet portion 16 is reinforced with stiffening rings 23 welded to the exterior wall or below the pressure vessel 12.

A cylindrical projectile 26 is slidably secured in the barrel 14 in alignment with the axis 15. The projectile 26 has O-rings 28 and 29 respectively located at the forward and rearward ends thereof. In the cocked position shown, the projectile 26 straddles the orifices 22. The O-rings 28 and 29 extend beyond the ends of slots 22 and form a gas seal between the shell 12 and the barrel 14 when the projectile 26 is secured in the cocked position as shown. A quick release trigger mechanism 30 secures the projectile 26 in the cocked position. In operation, a pressurized gas, at for example 300 psi, such as air, is supplied to the shell 12 through a suitable valve system 13 shown schematically. The slots 22 allow the compressed air from the shell 12 to expand into the barrel 14 above the projectile 26 to drive it forward when the trigger mechanism 30 is released.

A liquid reaction mass 32 such as water fills the reaction mass portion 20 of the barrel 14 above the trigger mechanism 30. The reaction mass 32 may be separated from the projectile portion 18 by means of a frangible fluid tight diaphragm 34 supported by a grate structure 36 secured to the barrel 14 as shown.

In the embodiment illustrated, barrel 14 has multiple sections, including a permanent section 21 affixed to the annular pressure vessel 12 and rearward section 23 for containing the reaction mass 32. A central section 18 formed with the slots 22 that allows flow of the pressurized gas into the barrel 14 once the projectile 26 is released. A forward section 27 receives a precision machined liner 29 to effect the planar travel of the projectile 26 toward the outlet end 16. Additional barrel sections 31, 33, may attach to the permanent barrel section beneath the annular pressure vessel to extend the length of the barrel. Should the liner 29 or additional barrel section 31, 33 become damaged they may be repaired or replaced as needed as opposed to destroying the entire gun because of one damaged section.

A frangible cover 37 may optionally be disposed in sealing relationship over the outlet portion 16 of the gun 10. The space between the cover 37 and the projectile 26 may be evacuated to enhance the firing efficiency of the gun and to minimize any air precursor travelling in front of the projectile 26.

The quick release mechanism 30 secures the projectile in the cocked position, as shown, and is capable of supporting the weight of the projectile 26, the force of the high pressure gas and the vacuum load, if applied. The release mechanism 30 also is designed to release the load smoothly, quickly and reliably. In one embodiment the release mechanism 30 is designed to support a load of at least 30,000 lbs.

The projectile 26 is effective to seal the gun in the cocked position. The projectile 26 also has an energy-absorbing target-engaging surface 38, hereinafter described, which in addition to its large diameter promotes the generation of a uniform shock field.

In use, the gas gun 10 is mounted vertically on a box frame structure 39 resting on the ground 40 and straddling an open trench 41. The gun 10 rests on the frame 39 and is supported by bearings 44 attached to or formed on the lower end of the shell 12. The ground 40 and trench 41 may be formed with a reinforced concrete liner 43 as shown. The outlet end 16 of the gun 10 faces a target area 46 in the bottom of the trench 41. Transducers 48 are buried in the target area 46 and carry shock signals to a remote sensing and receiving apparatus not shown.

When the projectile 26 is released by the release mechanism 30, air pressure in the shell 12 causes the projectile 26 to be accelerated along the barrel 14 towards the outlet 16 for impacting the target 46. When a vacuum is applied to the outlet portion 16 as noted above, the projectile firing efficiency is thereby increased and the air precursor in front of the projectile 26 is minimized.

Figure 2:
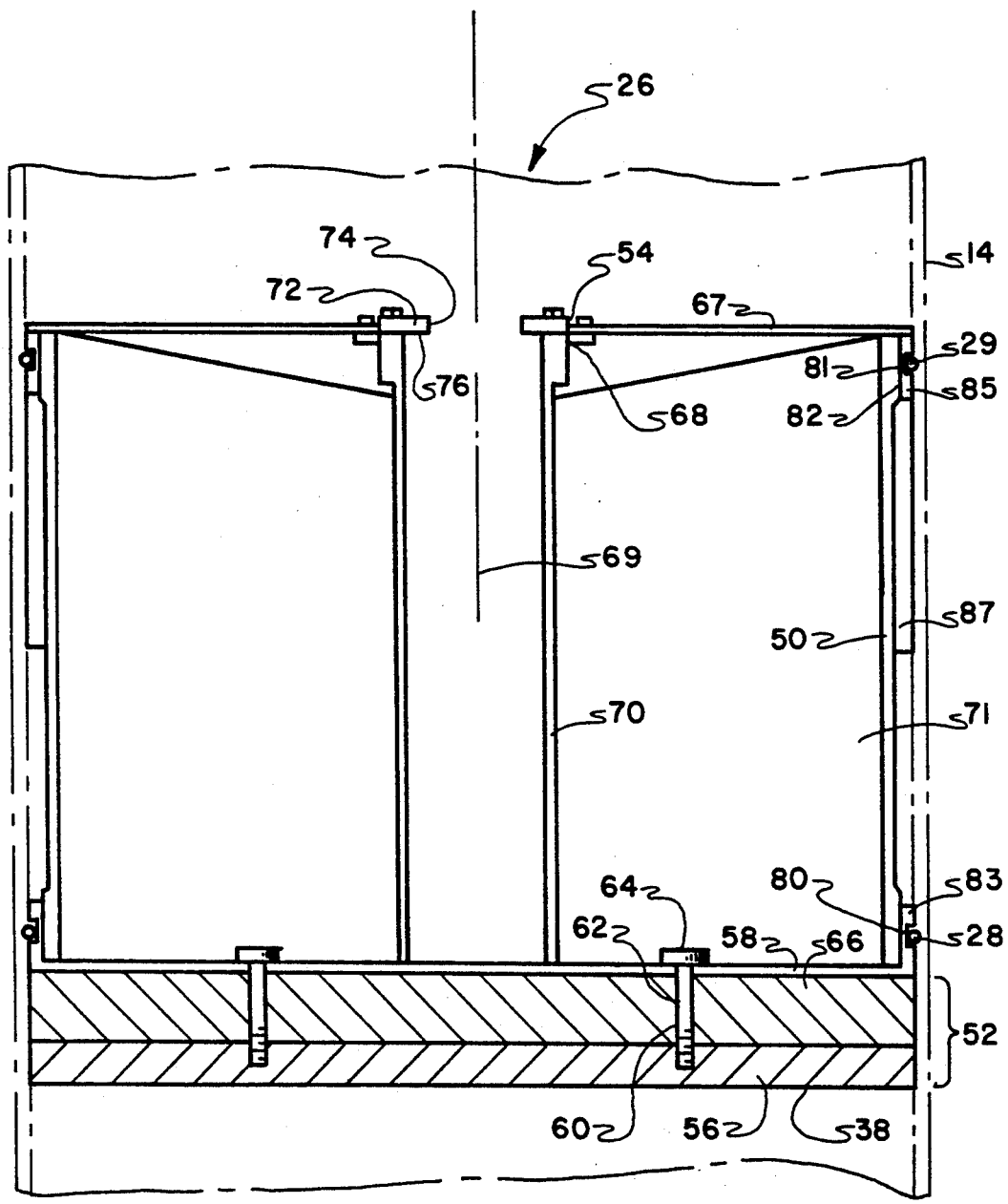
FIG. 2 is a side sectional view of the projectile for use in the gas gun in FIG. 1.

The projectile 26, shown in FIG. 2, is a weighted cylinder 50 having a planar target impacting portion 52 secured at the front end thereof and a projectile support 54 at the rear end. The target impacting portion 52 includes target engaging surface 38 which is in the form of a planar plate 56 secured by pins 60 in spaced relationship with an apertured support plate 58. In the embodiment illustrated, the pins 60 are attached to the impact plate 56 and are slidable in the apertures 62 in the plate 58. The heads 64 of the pins 60 act as stops for establishing a spaced relationship between the impact plate 56 and the support plate 58. A resilient energy-absorbing layer 66 is disposed in the space between the impact plate 56 and the support plate 58.

The projectile support 54 includes an apertured pressure plate 67 having a central aperture 68 aligned with the central axis 69 of the projectile 26. The pressure plate 66 is secured to the rearward end of the cylinder 50 opposite the support plate 58. An inner cylindrical support 70 is secured along the projectile axis 69 between the apertured support plate 58 and the pressure plate 66. Gussets or webs 71 are secured in a spaced relationship between the inner cylindrical support 70 and the cylinder 50 for reinforcing the cylinder 50 against the applied air pressure through the slots 22. The webs 71 are also attached to the support plate 58 for reinforcement of same. An annular trigger flange or ring 72 is secured about the aperture 68 at the rearward end of the inner cylindrical support 70. The trigger flange 72 has a central opening 74 centered on the axis 69, and a forward bearing surface 76.

The O-rings 28 and 29 noted hereinabove are captured respectively in slots 80 and 81 formed in respective annular bands 83 and 85 formed about the outer wall 82 of the cylinder 50. The O-rings 28 engage the barrel walls and seal the projectile 26 in gas tight relationship with the barrel 14. As shown, the O-rings 28 and 29 bridge the slots 22 when the projectile 26 is in the cocked position as shown.

The cylinder 50 also may have four equispaced guides 87 attached to its outer wall 82. The guides 87 extend from below the upper bands 85 along the outer wall 82 as shown for maintaining alignment of the projectile axis 69 with the barrel axis 15 during loading.

Figure 3:
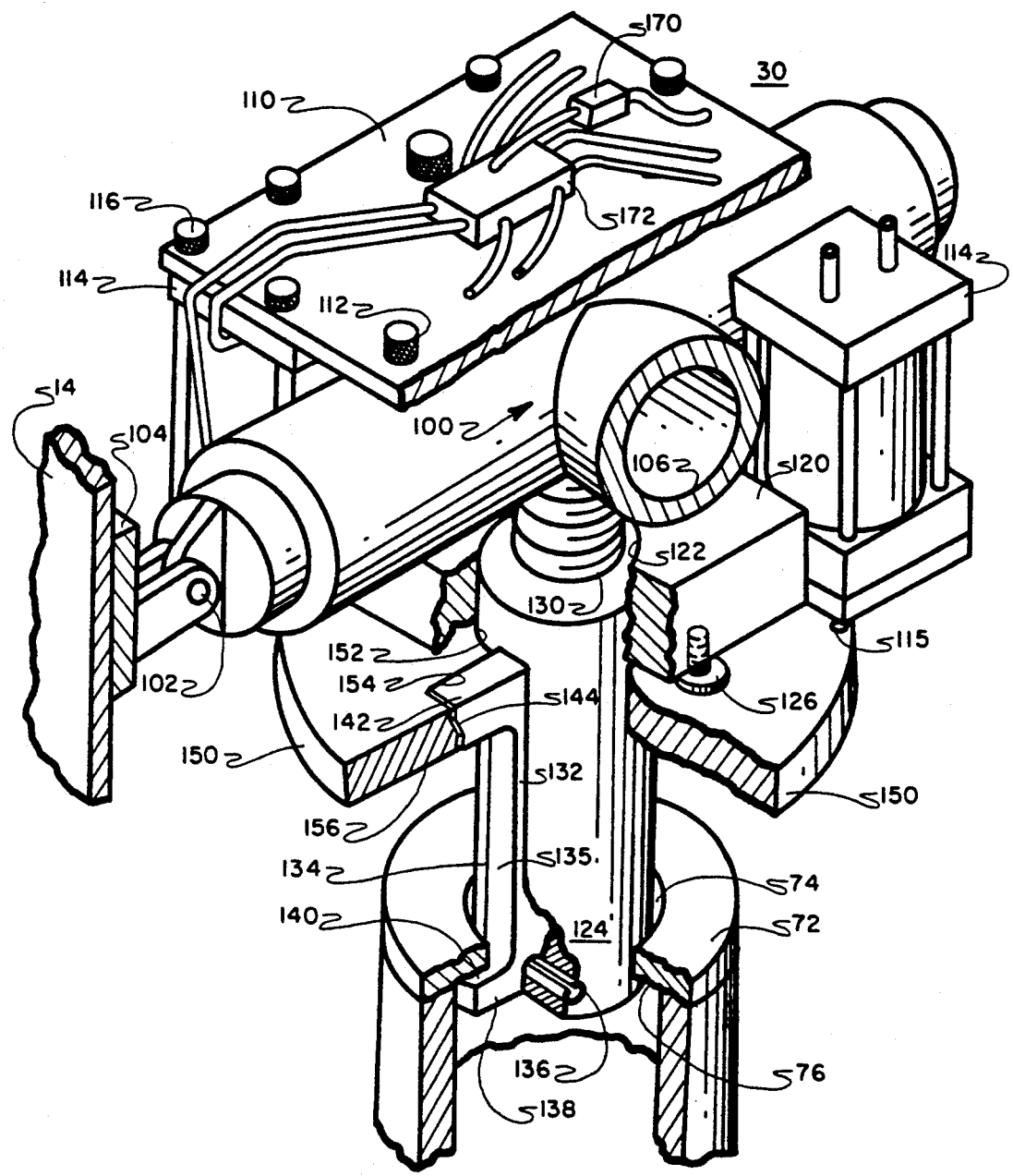
FIG. 3 is a fragmentary perspective of the quick release trigger according to the present invention.
Figure 3A:
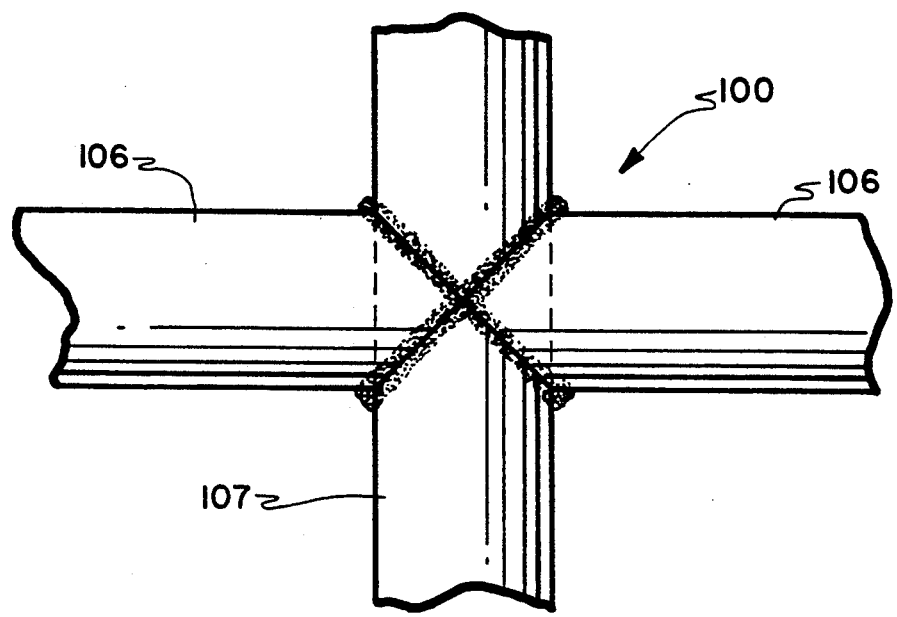
FIG. 3A is a detail of the trigger support.

The trigger mechanism 30 shown in FIGS. 3 and 3A is supported within the barrel 14 of the gas gun 10 beneath the water reaction mass support grate 34 by support cross member 100. The cross member 100 has pinned clevis connections 102 which are secured to pads 104 welded to the inner wall of the barrel 14. The cross member 100 is constructed by welding two mitred lengths 106 of double heavy steel pipe about a single length 107 of same (FIG. 3A). An air cylinder support plate 110 is secured to the cross member 100 by means of bolts 112 passing through corresponding apertures in the plate 110 and cross member 100.

Four pneumatic cylinders 114 each having a movable actuation 115 are secured between the cross member 100 in corners of the plate 110 by means of corresponding support bolts 116. An apertured trigger base 120 is located beneath the cross members 100 and has a hole pattern for receiving the bolts 112 through the cross members whereby the square plate 110 is secured to the trigger base plate 120. The base plate 120 also has a threaded aperture 122 for receiving depending trigger housing 124. Also, the trigger base 120 is notched in the corners for providing clearance for the air cylinders 114. One or more stop members 126 are secured in corresponding apertures in the lower side of the trigger base 120 as shown.

The trigger housing 124 has a threaded end 130 secured in the threaded aperture 122 of the trigger base 120. The trigger housing 124 is cylindrical and depends from the trigger base 120 for engagement with the trigger flange 72. The latch housing 124 has a plurality of axial slots 132, one each for receiving a corresponding rotatable latch 134 therein. Each latch 134 is secured in the latch housing 124 by means of a pin 136 secured near the lower end of each latch 134 passing through apertures in the housing 124.

Each latch 134 is formed in the shape of an elongated generally "C" shape having a web 135 and a radial support bar 138, and a radial trigger 142 extending from opposite ends of the web 135, as shown. When the latch 134 is secured in the housing 124, the support member 138 extends radially from the housing 124 as shown.

The support 138 has a bearing face 140 which is adapted to engage the bearing surface 76 of the trigger flange 72 as illustrated. The trigger 142 likewise extends radially from the latch housing 124 as illustrated. The trigger 142 has a cam surface 144 at its free end.

A retaining collar 150 has a central opening 152 for slidably receiving the trigger housing 124 therein. The retaining collar 150 has a plurality of radial slots 154 which are aligned with the slots 132 in the housing 124. The slots 154 are adapted to accommodate each of the triggers 142. Each radial slot 154 has a cam surface 156 which is a mirror image of the cam surface 144 on each trigger 142 and which engages the same as hereafter described. The retaining collar 150 is secured to the actuators 115 of the air cylinders 114.

Figure 4:
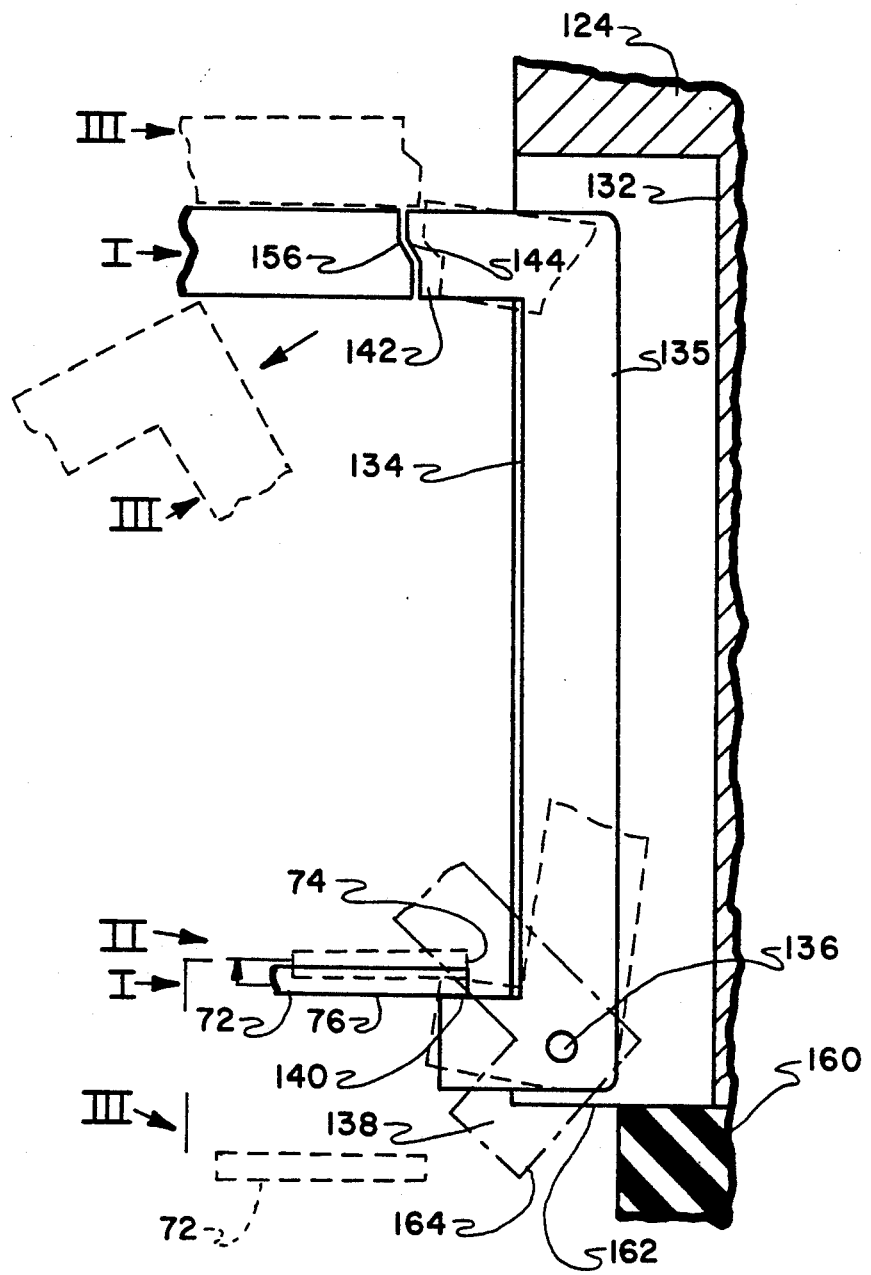
FIG. 4 is a fragmentary side sectional view showing the latch, collar and ring elements in the trigger of FIG. 3 in solid and phantom lines in the cocked and released position, respectively.
Figure 4A:
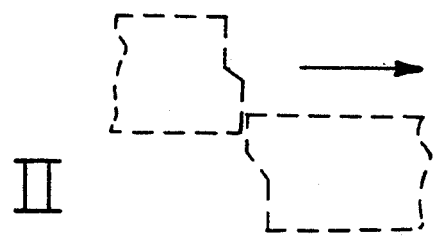
FIG. 4A is a detail showing the position of the latch just prior to release.

In the embodiment illustrated, the latch housing 124 carries three latches 134 equally spaced circumferentially of the housing 124. As illustrated in FIGS. 4 and 4A, the trigger flange 72 and each of the latches 134, shown in solid lines, are in a cocked position I such that the bearing surface 76 of the triggering flange 72 is at rest against the bearing surface 140 of each of the latches 134. The triggering flange 72, bearing the load of the projectile 26, the air pressure and any vacuum load in the barrel outlet portion 16, as hereinbefore described, bears downwardly against the bearing surface 140 causing the trigger 142 of latches 134 to be urged outwardly of the slots 132 so that the cam surfaces 144 and 156 bear against each other. The triggers 134 are released by causing the air cylinders 114 to retract the actuators 115 whereby the retaining collar 150 is lifted through position II (FIG. 4A), as shown in phantom, thereby allowing each latch 134 to rotate out of the corresponding slot 132 about pin 136. Rotation of the latch 134 causes the radial support 138 to rotate inwardly of the housing whereby the triggering flange 72 clears the latch and is thereby released at position III.

In order to assure a positive and forcible release of the triggering mechanism 30, the cam surfaces 144 and 156 are shaped, as illustrated, so that as the collar 150 moves from position I with respect t the latch 134 the radial trigger 142 is first urged inwardly of the housing 124 (clockwise towards position II in FIG. 4A). This causes a slight upward movement of the radial support 138 against the bearing surface 76 of the trigger flange 72 whereby the projectile 26 is moved opposite the release direction momentarily before release at position III (FIG. 4).

After the latch 134 is released, it rapidly rotates out of the slot 132. Each support member 138 is thus caused to rotatably disengage the support surface 76 of the trigger flange 72 whereby the projectile 26 is released. Upon release, the support 138 rotates towards the latch housing 124 to clear the aperture 74 in flange 72 (counter clockwise in FIG. 4). A resilient bumper 160 is secured to the depending face 162 of the latch housing 124 as illustrated. As each latch 134 rotates, the lower side 164 of the support 138 engages the bumper 160 for shock absorption.

As shown schematically in FIG. 3, the air cylinders 114 are connected by means of a four-way solenoid valve 170 and a manifold 172. In a first or vented position the valve 170 causes each cylinder 114 to move its corresponding actuator 115 and the retaining collar 150 downwardly of the latch housing 124 into the cocked position for engaging the latches 134. The stops 126 which are connected to the underside of the crossplate 120 stop the travel of the retaining collar 150 in the cocked position. In a second position each cylinder 114 moves the corresponding actuator 115 and the retaining collar 150 to the "fire" position for releasing the latches 134. In this second position the cylinders 114 urge the retaining collar upwardly of the latch 124 for triggering the release of the projectile 26.

When it is desired to set the projectile 26 in the cocked position, the latches 134 are rotated into the position shown and the are cylinders 114 are positioned so as to place the retaining collar 150 above the latches 134. With the latches released (i.e., out of slots 132) and the support members 138 facing downwardly, the projectile 26 is moved into position by external support means, not shown, whereby the support flange 72 engages the lower end of the housing 124. The external support may be a gantry removably locatable over the gun 10. Thereafter, while the projectile is held in position by the external support means (not shown), the latches 134 ar moved into cocked position and the retaining collar 150 is lowered to the stops 126 for engaging the trigger member 142. Thereafter the projectile 26 is released from the external support means so as to allow its weight to bear against the bearing surface 140 to thereby forcibly set the cam surface 144 of the latch 134 against the bearing surface 156 of the retaining collar 150.

The reaction mass 32, referred to above, is located above the triggering mechanism 30 and may be contained within the upper portion 20 of the barrel 14 by means of the water-tight diaphragm 34 supported by grate 36. When the triggering mechanism 30 is released, the air pressure within the shell 12 causes the projectile 26 to be downwardly accelerated towards the target area 46. Reaction of the gun 10 caused by the release of air pressure to drive the projectile, is compensated by means of the reaction mass 32. The force of the air pressure entering the barrel 14 upstream of the projectile 26 causes the diaphragm 34 to tear whereby some of the compressed air for driving the projectile is released through the reaction mass 32 whereby the gun 10 is maintained in position. It should be understood that alternatively the reaction mass may be contained within a resilient vessel (e.g., a flexible bag) which likewise breaks when the force of the air pressure is released.

The lower projectile 0-ring seal 28 also in combination with the cover 37 allows the chamber area below the projectile 26 to be evacuated in order to add approximately one-half atmosphere to the force exerted on the projectile during firing. It should be understood, however, that alternatively additional air pressure may be supplied to the shell 12 to increase firing efficiency if desired. The cover 37 is separable from the barrel and is carried by the projectile against the target area 46 when used. Reduced pressure also reduces the air precursor before the projectile 26.

While there has been described what at present is considered to be the preferred embodiment of the invention, it will be apparent to those skilled in the art that various changes and modifications may be made therein without departing from the invention. It is intended the appended claims to cover such changes and modifications as fall within the true spirit and scope of the invention.

What is claimed is:

1. A fluid actuated large diameter gun for producing repeatable controlled shock fields in a target area comprising:

a hollow barrel having a downstream projectile end for alignment with the target area and an opposite axially aligned upstream reaction end and having an intermediate side wall portion formed with a plurality of fluid inlets;

a projectile releasably securable in the barrel from a cocked position in communication with the fluid inlets; and wherein the projectile includes side walls having respective forward and rearward portions extending axially for closely engaging internal sidewalls of the barrel and for straddling the inlets when in the cocked position and forming a fluid seal therebetween;

a chamber for containing a fluid under pressure, said chamber secured externally of the barrel and enclosing the fluid inlets therewithin, said fluid for communicating with and pressurizing the barrel to cause the projectile to be slidably accelerated along the barrel to the outlet when released from the cocked position for engagement with the target area to thereby produce said shock field;

release means secured within the barrel for releasable attachment to the projectile, said release means for releasably supporting the projectile in the cocked position in sealing relation with the fluid inlets and for releasing the projectile from the cocked position to the firing, wherein the release means further comprises:

latches for engaging the projectile; a latch housing secured in the barrel carrying the latch between first and second positions for supporting and releasing the projectile respectively; and a releasable collar mounted in the barrel for relative movement with respect to the latch for engaging the latch in the first position and for disengaging the latch in the second position and wherein the latch and the collar each have corresponding camming surfaces for urging the projectile away from the outlet prior to release.

2. The fluid actuated gun of claim 1, including pneumatic means mounted in the barrel for engaging the collar for relative movement with respect to the latch.

3. The fluid actuated gun of claim 1, wherein the pneumatic means includes a plurality of gas cylinders each having a movable actuator for engaging the collar;
a manifold interconnecting the cylinders; and
a solenoid valve coupled to the manifold for directing gas into and out of the cylinders between the first and second positions.

4. The fluid actuated gun of claim 1, further comprising:
a fluid reaction mass disposed in the barrel rearwardly of the projectile for absorbing reaction forces produced by the fluid upon release of the projectile.

5. The fluid actuated gun of claim 1, further comprising:
a frangible diaphragm secured within the barrel between the projectile and the fluid reaction mass for sealing the reaction mass with respect to the projectile therein, said diaphragm being operative upon release of the projectile to shear and thereby allow a portion of the fluid under pressure to be dissipated within the fluid reaction mass to thereby reduce reaction of the gun against release of the projectile.

6. The fluid actuated gun of claim 1, wherein the projectile comprises a cylindrical member forwardly disposed target impacting face including a support surface attached to a forward margin of the projectile, a target engaging face attached in spaced relation with the supporting surface and a intermediate resilient member disposed therebetween.

7. The fluid actuated gun of claim 1, wherein the fluid is compressible gas.

8. The fluid actuated gun of claim 1, further including a liner portion sleeved with the barrel and extending from the downstream projectile end to the opposite axially aligned upstream reaction end.

9. The fluid actuated gun of claim 1, further including at least one end section removably secured to the barrel for extending the outlet portion thereof.

10. The fluid actuated gun of claim 1, further including means for aligning the projectile in the barrel including elongated ribs attached to an outer wall of the projectile. ribs attached to an outer wall of the projectile.

* * * * *